United States Patent [19]

Böhm et al.

[11] 4,419,469

[45] Dec. 6, 1983

[54] THERMOPLASTIC ELASTOMER BLENDS WITH BITUMEN

[75] Inventors: Georg G. A. Böhm; Lee E. Vescelius; Gary R. Hamed, all of Akron, Ohio

[73] Assignee: The Firestone Tire & Rubber Company, Akron, Ohio

[21] Appl. No.: 140,905

[22] Filed: Apr. 16, 1980

Related U.S. Application Data

[60] Continuation-in-part of Ser. No. 1,623, Jan. 8, 1979, Pat. No. 4,250,273, which is a continuation-in-part of Ser. No. 879,308, Jan. 21, 1978, abandoned, which is a division of Ser. No. 806,036, Jun. 13, 1977, abandoned.

[51] Int. Cl.³ .............................................. C08L 95/00
[52] U.S. Cl. ...................................... 524/68; 524/66; 524/70; 524/71
[58] Field of Search .................. 260/28.5; 524/66, 68, 524/70, 71

[56] References Cited

U.S. PATENT DOCUMENTS

| | | | |
|---|---|---|---|
| Re. 28,688 | 1/1976 | Cook | 260/4 |
| 2,830,767 | 8/1974 | Candor | 260/28.5 B |
| 2,877,206 | 3/1959 | Scott | 260/45.5 |
| 2,918,940 | 12/1959 | Carr | 260/28.5 AS |
| 3,299,174 | 1/1967 | Kuhre et al. | 260/876 |
| 3,407,253 | 10/1968 | Yoshimura | 264/289 |
| 3,424,649 | 1/1969 | Nyberg | 161/253 |
| 3,572,721 | 3/1971 | Harrison | 260/4 |
| 3,665,059 | 5/1972 | Mahiman | 260/897 A |
| 3,689,595 | 9/1972 | Gwinn | 260/876 B |
| 3,701,702 | 10/1972 | Shichman | 156/244 |
| 3,758,643 | 9/1973 | Fisher | 260/897 A |
| 3,793,283 | 2/1974 | Fraley | 260/33.6 AQ |
| 3,806,558 | 4/1974 | Fisher | 260/897 A |
| 3,850,474 | 11/1974 | Welch | 260/826 B |
| 3,862,106 | 1/1975 | Fisher | 260/897 A |
| 4,104,210 | 8/1978 | Ceran | 260/888 |
| 4,151,159 | 4/1979 | Geall | 260/42.46 |

FOREIGN PATENT DOCUMENTS

| | | | |
|---|---|---|---|
| 2010209 | 6/1979 | United Kingdom | 260/876 |
| 1548541 | 7/1979 | United Kingdom | 260/876 |

Primary Examiner—J. Ziegler

[57] ABSTRACT

Thermoplastic elastomer compositions of the present invention comprise a blend of from about 10 to about 50 parts by weight of a crystalline 1-olefin polymer, from about 80 to about 15 parts by weight of a styrene-butadiene rubber, and from about 5 to about 50 parts by weight of bitumen. The thermoplastic blends have unexpectant increases in properties, especially tear strength, tensile strength, high temperature (100° C.) tear strength, and smooth surfaces when injection molded. Moreover, the bitumen lowers the injection molding pressure, thus enabling larger parts to be molded. The compositions, which may be partially cured, also have excellent aging properties. The compositions are a true thermoplastic in that they can be repeatedly processed and yet maintain their good physical properties.

5 Claims, No Drawings

THERMOPLASTIC ELASTOMER BLENDS WITH BITUMEN

CROSS-REFERENCE

The present application is a continuation-in-part of U.S. Ser. No. 001,623, filed Jan. 8, 1979 U.S. Pat. No. 4,250,273 for "Thermoplastic Elastomer Blends," which is a continuation-in-part of U.S. Ser. No. 879,308, filed Feb. 21, 1978 abandoned, which relates to "Thermoplastic Elastomer Blends of 1-Olefin Polymers with Styrene-Butadiene Rubber," which is a division of U.S. application Ser. No. 806,036, filed June 13, 1977, now abandoned.

BACKGROUND OF THE INVENTION

The present invention relates to thermoplastic elastomer compositions made from blends of 1-olefin polymers such as polypropylene, styrene-butadiene rubber, and bitumens such as asphalts, tars, and their derivatives, with the composition blends requiring no curing or vulcanization to develop elastomeric properties. Additionally, the invention also relates to partially cured compositions. These partially cured compositions are still thermoplastic and can be repeatedly remolded or extruded and require no further cure.

Heretofore, a few specific types of thermoplastic elastomers have been known. The term "thermoplastic elastomer" has generally been applied to elastomers which can be readily processed and reprocessed, molded, or the like, by common or conventional thermoplastic methods and which do not require vulcanization to develop the various physical properties.

Previous specific types of known thermoplastic elastomers are the thermoplastic urethanes, the thermoplastic polyesters, such as the Hytrel brand manufactured by DuPont, and the styrene block copolymers sold under the brand names of Kraton and Solprene, manufactured respectively by Shell Oil Company and Phillips Petroleum.

Another very recent thermoplastic elastomer is a blend of polypropylene and EPDM (ethylene-propylene-nonconjugated diene monomer) as described in U.S. Pat. Nos. 3,758,643; 3,806,558; and 3,862,106 to Fischer of Uniroyal, Inc. The blends are partially cured and contain EPDM in amounts up to 90 percent by weight.

Various prior art patents generally disclose blends of a triblock copolymer such as styrene-butadiene-styrene with a polyolefin such as the following Shell patents, U.S. Pat. Nos. 3,424,649 and 3,793,283.

U.S. Pat. No. 3,299,174 relates to a blend of polypropylene and a saturated block copolymer of the S-B-S type.

U.S. Pat. No. 3,830,767 is very similar except that it additionally contains a petroleum hydrocarbon wax to minimize the bleeding of extended oils from the propylene-block copolymer composition. Still further examples of blends of polypropylene and styrene-butadiene block copolymers include U.S. Pat. Nos. 3,689,595 and 3,850,474 wherein such a blend is utilized for automobile body components. A crosslinked blend is set forth in U.S. Pat. No. Re. 28,688.

Various other prior art patents disclose blends of 1-olefin polymers and elastomers. For example, U.S. Pat. No. 3,572,721 to Harrison relates to a golf ball made from a blend of rubber and a thermoplastic. In order to render the ball effective for use, it must be fully cured.

U.S. Pat. No. 3,655,059 to Mahlman relates to polyphase compositions having, as a continuous phase, a propylene polymer and, as a second phase, a synthetic or natural rubber, which compositions are prepared by disbursing a propylene polymer of substantially submicron particle size in the second phase and by mixing the polymer under conditions which ensure formation of the propylene polymer in a continuous phase.

U.S. Pat. No. 3,701,702 to Schichman relates to a method of free curing rubber by adding polypropylene to synthetic rubbers or to natural rubber, or blends thereof and, thus, lacks any suggestion of bitumen.

U.S. Pat. No. 2,877,206 to Scott relates to a peroxide treatment of blends of polymers of 1-olefins and hydrogenated diene polymers. A cured or vulcanized blend results, which is distinguished from the present invention, in failing to suggest a thermoplastic elastomer.

U.S. Pat. No. 4,104,210 to Coran et al relates to blends of 55 to 75 percent by weight of high unsaturated diene rubber with 25 to 45 percent of a polyolefin wherein primarily the toughness, as represented by $TS^2/E$ where TS is tensile strength and E is Young's Modulus, is increased by at least 50 percent or more than a blend containing 50 percent of each component. Moreover, the rubber particles which have a particle size of 50 microns or less are distributed throughout the polypropylene resin.

U.S. Pat. No. 3,407,253 to Yoshimura et al relates to orientated porous polyolefin-elastomer blend sheets containing at least one crystallizable polyolefin with at least one elastomer.

U.S. Pat. No. 3,830,767 to Condon relates to minimizing the bleeding of extending oils from compositions containing hydrogenated block copolymers and polypropylene through the addition of a petroleum hydrocarbon wax.

U.S. Pat. No. 4,151,159 relates to a plastic composition containing an olefin polymer, a styrene polymer, a butyl rubber, and optionally an ethylene/vinyl polymer.

British Pat. No. 1,548,541 relates to bitumen compositions containing styrene-diene block copolymers.

British Pat. No. 2,010,289 again relates to basically a bitumen product which has small amounts, that is up to about 15 percent, of a tetrachain radial teleblock polybutadiene/polystyrene copolymer.

The above prior art patents, when combined in any combination whatsoever, are still not pertinent to the present invention for at least the reasons that such combination is not rendered obvious by the patents themselves and further in that they relate to different blend compositions which often are fully cured.

SUMMARY OF THE INVENTION

It is therefore an object of the present invention to provide a thermoplastic elastomer comprising a blend of a 1-olefin polymer or copolymer, a styrene-butadiene copolymer, and bitumen.

It is another object of the present invention to provide a thermoplastic elastomer composition, as above, wherein such compositions may or may not be partially cured, wherein they have good physical properties without the requirement of any vulcanization, and wherein they may be readily reprocessed and still retain their good physical properties.

It is a further object of the present invention to provide a thermoplastic elastomer composition, as above, wherein the blends are mixed at or above the melting temperature of said 1-olefin polymers or copolymers.

It is another object of the present invention to provide a thermoplastic elastomer composition, as above, wherein said bitumen includes asphalts such as petroleum asphalts, for example straight-reduced asphalts, thermal asphalts, or air-blown asphalts; native asphalts, for example with mineral content below 5 percent or mineral content over 5 percent; or tars and their derivatives, for example residua from coke-oven-dried coal tars or residua from other pyrogenous distillates.

It is yet another object of the present invention to provide a thermoplastic elastomer composition, as above, which unexpectantly has very good properties, e.g., very good tear and tensile strength, very good hot tear strength, a very smooth surface, a low brittle point, and good low temperature impact resistance.

It is yet another object of the present invention to provide a thermoplastic elastomer composition, as above, which has a low injection molding pressure and thus enables larger parts to be injection molded.

Generally, such a thermoplastic elastomer composition comprises a blend of from about 10 to about 50 parts by weight of a crystalline 1-olefin polymer, said 1-olefin polymer selected from the class consisting of a homopolymer or a copolymer made from 1-olefin monomers having from 2 to 20 carbon atoms, said homopolymer or said copolymer having a melting point of at least 90° C.; from about 80 to about 15 parts by weight of a styrene-butadiene rubber; and from about 5 to about 50 parts by weight of a bitumen, said blend forming a thermoplastic elastomer.

Additionally, a thermoplastic elastomer composition comprises a blend of from about 10 to about 50 parts by weight of a crystalline 1-olefin polymer, said 1-olefin polymer selected from the class consisting of a homopolymer and a copolymer made from 1-olefin monomers having from 2 to about 20 carbon atoms, said homopolymer or said copolymer having a melting point of at least 90° C.; from about 80 to about 15 parts by weight of a styrene-butadiene rubber; and from about 5 to about 50 parts by weight of a bitumen, said blend being partially cured and having a melt flow index of at least 1.0 so that a thermoplastic elastomer is formed.

Generally, a process for making a thermoplastic elastomer blend composition comprises the steps of providing a blend of a 1-olefin polymer, a styrene-butadiene rubber and a bitumen; the amount of said 1-olefin polymer ranging from about 10 to about 50 parts by weight, the amount of said styrene-butadiene rubber ranging from about 80 to about 15 parts by weight, the amount of said bitumen ranging from about 5 to about 50 parts by weight, said 1-olefin polymer selected from the class consisting of a homopolymer and a copolymer made from 1-olefin monomers having from 2 to about 20 carbon atoms, said homopolymer or said copolymer having a melting point of at least 90° C., and mixing said blend at a temperature at or above the melting point of said crystalline 1-olefin polymer so that a reprocessable thermoplastic elastomer blend is formed.

Additionally, a process for making a thermoplastic elastomer blend composition, comprises the steps of providing a blend of a 1-olefin polymer, a styrene-butadiene rubber and a bitumen, the amount of said 1-olefin polymer ranging from about 10 to about 50 parts by weight, the amount of said styrene-butadiene rubber ranging from about 80 to about 15 parts by weight, the amount of said bitumen ranging from about 5 to about 50 parts by weight, said 1-olefin polymer selected from the class consisting of a homopolymer and a copolymer made from 1-olefin monomers having from 2 to about 20 carbon atoms, said homopolymer or said copolymer having a melting point of at least 90° C., mixing said blend at a temperature at or above the melting point of said 1-olefin polymer, and partially curing said blend to have a melt flow index of at least 1.0 so that a reprocessable thermoplastic elastomer is produced.

PREFERRED EMBODIMENTS OF THE INVENTION

The thermoplastic elastomer compositions of the present invention relate to uncured or partially cured blends of 1-olefin polymers, styrene-butadiene rubber, and bitumen. The 1-olefin polymer can be a homopolymer or a copolymer of various 1-olefin monomers having from 2 to 20 carbon atoms and having a number average molecular weight of from about 10,000 to about 1,000,000. Examples of suitable 1-olefin monomers include ethylene, propylene, 1-butene, 1-pentene, 1-hexene, 1-octene, 4-methyl-1-hexene, 4-ethyl-1-hexene, 6-methyl-1-heptene, and the like. A preferred monomer is ethylene with a highly preferred monomer being propylene. It is an important aspect of the present invention that only 1-olefin polymers or copolymers be utilized which have a melting point of 90° C. or higher. Thus, whenever various 1-olefin monomers are utilized in preparing a copolymer, the amount of each must be such that a copolymer is produced having a melting point of at least 90° C. and preferably at least 130° C. A preferred copolymer is made from a major amount by weight of ethylene monomers and a minor amount of propylene monomers. A highly preferred copolymer is made from a major amount by weight of propylene and a minor amount by weight of ethylene.

The amount by weight of the 1-olefin polymer or copolymer in the total blend ranges from about 10 parts to about 50 parts with from about 30 parts to about 45 parts being preferred. The weight of the styrene-butadiene rubber ranges from 80 parts to about 15 parts by weight with from 65 parts to 25 parts by weight being preferred.

The butadiene-styrene rubber is a random copolymer made from monomers of butadiene and styrene. The copolymer can be prepared in any common or conventional manner well known to the art such as by solution or emulsion polymerization. Additionally, the specific type of styrene-butadiene rubber may vary. For example, the butadiene portion may be largely 1,2-polybutadiene, that is as high as 90 or even 100 percent, or largely 1,4-polybutadiene, that is as high as 90 or even 100 percent. The amount by weight of the butadiene may vary greatly with a range of from about 60 percent to about 90 percent by weight based upon the total copolymer being preferred. The number average molecular weight of the copolymer is generally from about 50,000 to about 1,000,000.

Similarly, the 1-olefin polymer such as the preferred polyethylene and the highly preferred polypropylene may be prepared in any common or conventional manner so long as it is largely crystalline such as an isotactic configuration. Generally, the melt flow index of the 1-olefin polymer and especially polypropylene can range from about 0.4 to about 30 with a preferred range being from about 2 to about 12 according to ASTM No. D1238. Thus, an isotactic 1-olefin polymer is preferably utilized, although an amount such as from 0.1 up to about 15 percent by weight, based upon the total weight of the 1-olefin polymer of a low crystalline atactic configuration of a particular 1-olefin polymer are not only economical, but also improve flow and do not significantly reduce the various physical properties. Generally, amounts in excess of a total of 15 percent of an atactic configuration of a specific 1-olefin polymer are undesirable since the physical properties are reduced; but, in some applications, such a blend may be acceptable and even desirable.

Regardless of the specific type of 1-olefin polymer utilized, the particle size is that produced by normal and conventional polymerization techniques. Generally, the particle size is greater than 1.0 microns and desirably larger than 5.0 microns. From a practical standpoint, large particles such as up to 2 millimeters may be conveniently utilized, as well as even larger particles.

The amount of bitumen ranges from about 5 to about 50 parts by weight and preferably from about 10 to about 40 parts. Generally, as an amount of bitumen is added, the amount of SBR is decreased. The term "bitumen" can generally be defined as mixtures of hydrocarbons of natural or pyrogenous origin or combinations of both, frequently accompanied by their non-metallic derivatives, which may be gaseous, liquid, semi-solid or solid, and which are usually soluble in carbon disulfide. For the purpose of the present invention, bitumen of a liquid, semi-solid or solid nature is utilized. From a commercial standpoint, bitumen is generally restricted to asphalts and tars and pitches. A listing of various bituminous materials which can be utilized in the present invention include the following:

I. Asphalts

1. Petroleum Asphalts
    A. Straight-reduced asphalts
        1. Atmospheric or reduced-pressure reduction
        2. Solvent precipitated, as with propane
    B. Thermal asphalts, as residues from cracking operations on petroleum stocks
    C. Air-blown asphalts
        1. Straight-blown
        2. "Catalytic"-blown
2. Native Asphalts
    A. With mineral content below 5 percent
        1. Asphaltites such as gilsonite, graphamite, and glance pitch
        2. Bermudez and other natural deposits
    B. With mineral content over 5 percent
        1. Rock asphalts
        2. Trinidad and other natural deposits II. Tars and Derivatives 1. Residua from coke-oven-derived coal tars
    A. Coal tars reduced to float grades, as RT (road tar) grades for paving purposes
    B. Coal-tar pitches, with reduction carried out to softening-point grades
2. Residua from other pyrogenous distillates as from water-gas, wood, peat, bone, shale, rosin, and fatty acid tars.

As can be readily appreciated by those skilled in the art, the weight average molecular weight of the various bitumens can vary over a very wide range, for example such as from about 500 to about 10,000. Additionally, the softening point of the various types of asphalt will also vary such as from about 50° F. to about 400° F.

Thus, although the specific amount of the bitumen may vary with specific type, when added to the polypropylene and styrene-butadiene random copolymer rubber, it will actually improve various physical properties. Such results, which are verified by the following examples were completely unexpected and in fact yield a synergistic result in that one would expect the tensile strength, the hot tear, and the like, to result in poor properties due to the various nature of the bitumen.

Of the many types of asphalts which may be utilized, petroleum, and native are desired, with petroleum being preferred. Of the petroleum asphalts, the thermal asphalts are preferred. Examples of specific asphalts include Pioneer 566, Pioneer 787, and Pioneer 442 manufactured by Witco Chemical Corporation.

The blend of the 1-olefin polymer, the styrene-butadiene rubber, and the bitumen, whether or not partially cured, results in a thermoplastic elastomer. That is, the blend is considered a thermoplastic elastomer in that it can be repeatedly reprocessed even if partially cured. In other words, the blend can be readily and repeatedly molded, extruded, or otherwise processed since it flows at temperatures at or above the melting point of the 1-olefin polymer. Generally, a partial cure is preferred in that the physical properties are improved including a remarkable increase in hot tear at 100° C. and a decrease in tensile set.

By partial cure, it is meant that the styrene-butadiene rubber portion of the blend is crosslinked to an extent less than full cure of vulcanization. According to the concepts of the present invention, a partial cure is achieved when the melt flow index (ASTM No. D1238, condition "L," but with the exception that the load is 100 pounds) is at least 1.0 and preferably 10.0 or greater. Compositions of the 1-olefin polymer, styrene-butadiene rubber and bitumen, which are cured in excess of a partial cure and thus have a melt flow index below 1.0, result in vulcanized blends of thermoset elastomers which are clearly outside the scope of the present invention. The partial cure may be obtained utilizing any conventional curing agent, compound or method, as set forth below. Generally, good blends of the present invention will have a melt flow index of from about 90 to about 150.

It is a critical aspect of the present invention that the 1-olefin polymer, the styrene-butadiene rubber, and the bitumen be mixed together at a temperature equal to or greater than the melting point of the 1-olefin polymer. Due to variations in molecular weight and tacticity, the melting point will vary over a small range from the particular 1-olefin polymer. The typical polyethylene will have a melting point range of from about 127° C. to about 140° C. with a typical melting point of approximately 135° C. The melting point range for the highly preferred polypropylene is from about 150° C. to about 175° C. with a practical or typical melting point temperature of from about 160° C. Thus, temperatures within this range, or desirably above it, are necessary to the present invention. The actual blending or mixing may be according to any common or conventional mixing process and, thus, may conveniently take place on a mill, a Banbury, a Brabender, a twin screw extruder, or the like. When a partial cure is utilized, preferably, the three components are first blended and then partially cured, although the styrene-butadiene rubber can be initially partially cured and then blended with the 1-olefin polymer and the bitumen.

Another method of preparation involves the addition of all dry ingredients to a styrene-butadiene rubber latex. When the SBR latex is coagulated by standard and well known techniques, all ingredients are intimately mixed. This mixture is then mixed in a manner, as on a mill, at temperatures above the melting point of the polypropylene and the thermoplastic elastomer blend is formed.

If a partial cure is utilized, the curing agent can be conveniently added as well as other conventional processing aids, compounding ingredients, and the like either before or during the blending step. Moreover, the partial cure may be achieved under either static conditions or under dynamic conditions. Under static conditions, the partial cure can be achieved by placing a mixed blend containing the curing agent in an oven and heating to a desired temperature, whereby partial cure occurs such as at a temperature of from about 65° C. to about 260° C. for approximately 5 to 30 minutes. The dynamic partial cure is achieved by working or processing the blend containing the curing agent on an open mill, in a Banbury, in an extruder, or the like, at a temperature sufficient to bring about a partial cure such as from about 65° C. to about 210° C. for approximately 5 to 20 minutes. Even if the dynamic cure occurs below the melting point of the 1-olefin polymer, the dynamic blend temperature must be at a temperature above the melting point of the 1-olefin polymer.

As noted, the curing agent utilized, when a partial cure is desired, may be any known or conventional rubber curative or method known to those skilled in the art. Variations from standard procedures or compounds may, or course, be utilized. Typical types of curing agents include the sulfur curatives such as sulfur itself, or sulfur donating compounds, the various peroxides, whether aromatic or aliphatic, and low dosages of irradiation. If a sulfur curative is utilized, generally from about 0.01 to about 1.0 parts by weight per 100 parts of the blend is utilized with the preferred range being from about 0.1 to about 0.2 parts. Such representative examples of sulfur curatives include sulfur, tetramethyl thiorea, 2-(hexamethyleneiminothio)-benzothiazole, sulfur dichloride, sulfur monochloride, alkyl phenol disulfide, and tetramethyl thiuram disulfide. A preferred curative is sulfur itself. Generally, it is desirable to use with the sulfur from about 0.5 to about 5 parts per 100 parts of blend of zinc oxide, conventional amounts of stearic acid and an accelerator since very good antioxidant properties are imparted to the blend. These unexpected results are especially noted with regard to the highly preferred 1-olefin polymer of polypropylene.

The amount of the organic peroxides to effect a partial cure generally varies from about 0.01 to about 0.5 parts by weight per 100 parts of the blend with a preferred range being from about 0.1 to about 0.3. Once again, any conventional peroxide compound may be utilized such as the aromatic diacyl peroxides, dibasic acid peroxides, ketone peroxides, alkyl peroxyesters, alkyl hydroperoxides, and the like. Specific examples include dicumyl peroxide, dibenzoyl peroxide, diacetyl peroxide, bis-2,4-dichlorobenzoyl peroxide, ditertiarybutyl peroxide, tertiary-butylcumyl peroxide, and the like. Of course, the number of the various peroxides is enormous and generally any of them can be utilized, with the above specific compounds merely being representative examples. A preferred peroxide curative is dicumyl peroxide and 2,5-bis(tertiary-butylperoxy) 2,5-dimethylhexane.

Of course, multiple peroxide curatives, multiple sulfur curatives, as well as combinations of sulfur and peroxide curatives may be utilized as well known to those skilled in the art. Furthermore, the amount of the curative range set forth above, naturally represents the amount of the active compound. Thus, if a curative is utilized such as dicumyl peroxide in a solvent system, only the weight of dicumyl peroxide itself is considered. Additionally, the exact amount of a specific curative utilized to obtain a specific melt flow index will vary from one specific curative to another, depending on the general activity or efficiency of the specific curatives.

Another method of achieving the partial cure involves subjecting the blend to ionizing irradiation. Ionizing rays include alpha rays, beta rays, gamma rays, electron beam, proton rays, neutron rays, and X-rays. In most commercial applications, an accelerated electron beam is utilized. The irradiation is desirably carried out by subjecting pellets or a thin layer of the blend to the irradiation. The irradiation may be admitted from one side or from both sides of the blend composition. The amount of irradiation, of course, will vary with the thickness of the blend composition. In any event, a desirable amount of irradiation is that which results in a partially cured blend having a melt flow index above the index number set forth above. Due to the inherent nature of the irradiation application, the crosslink density of the styrene-butadiene copolymers will vary with the distance from the irradiated surface. This aspect is acceptable as long as an overall, partially cured system is produced. However, too high of a dose will result in a crosslinked system which cannot be molded or extruded, that is, it is not reprocessable. Generally, when the irradiation is admitted to only one side of the blend composition, the amount of irradiation may vary from about 0.1 to about 5.0 Megarads, when an electron accelerator is utilized, and from about 0.1 to about 3.0 Megarads, when the irradiation is applied to each side of the blend composition.

In addition to the curing agents as noted above, other rubber components, compounding agents, fillers, processing aids, and the like may be added in conventional amounts. Specific types of additives include, in addition to accelerators, activators, colorants, antioxidants, flame retardants, ozone resistant compounds, and various processing aids such as oil, stearic acid, and the like. Examples of fillers include carbon black, such as from about 0.1 and preferably from about 0.6 parts to about 30 to 40 parts by weight per 100 parts of the blend. Other fillers such as silica, the various clays, calcium carbonate, talc, and the like can be utilized in conventional amounts.

The compositions of the present invention have unexpected and improved synergistic physical properties above and beyond that of blends of polypropylene and styrene-butadiene rubber. As readily apparent from the examples herein, the compositions have improved tensile strength, improved tear strength, and improved elongation. Generally, the composition, whether or not partially cured, can be described as a tough but yet flexible thermoplastic material. The composites of the present invention may generally be utilized for a wide array of products and may be calendared, molded, injection molded, extruded, and the like. Moreover, another improved property is that, even though extruded, the product or article has a smooth surface.

The amount of the various components can be varied to achieve an exact combination of physical properties desired for a particular application. For example, in automotive exterior applications, it is imperative that the material be able to withstand impact at low temperature. It should also have a smooth surface and good paint adhesion. The compositions generally exhibit these properties when amounts of the various components are as set forth in the examples. However, when the same material is used to make a kitchen spatula, low temperature impact is irrelevant and, thus, if desired, the exact formulation may be changed. Accordingly, the thermoplastic elastomer compositions of the present invention are very versatile in that changes of the ratio of one component, for example styrene-butadiene rubber to the remaining components, can be made within the above set forth parameters and result in a wide range of desired physical properties. These changes will be obvious to those skilled in the art of rubber or plastics compounding.

The thermoplastic elastomer blends of the present invention may be utilized to produce articles as by molding, extruding, calendaring, vacuum-forming, and the like, with specific articles including tubing, cables, gaskets, toys, and household articles. A desired area of use resides in various mechanical or electrical parts such as wire coatings, and the like, since the composition is solvent resistant.

The invention will be better understood by reference to the various examples.

The following list identifies the various materials used in the examples.

| | |
|---|---|
| Profax 6523 | An isotactic polypropylene with a melt flow index of 4.0, made by Hercules, Inc. |
| FRS-1502 | A Firestone "cold" emulsion polymerized SBR copolymer with 23.5 percent bound styrene, ML/4/212 = 45. |
| TMTD | Tetramethylthiuram disulfide. |
| Santocure NS | t-butyl benzothiazole sulfenamide. |
| Irganoz 1076 | An antioxidant manufactured by Ciba-Geiby Chemical Corporation. |
| Pioneer Bitumens 787, 442 and 566 | Petroleum asphalts manufactured by Witco Chemical Company. |
| Amoco 1016 | An isotactic polypropylene having a melt flow index of 5.0, manufactured by The American Oil Company. |

EXAMPLES 1 THROUGH 11

DRY MIXING

The styrene-butadiene rubber was sheeted out on a two-roll mill at a temperature between 90° C. to 100° C. The remaining ingredients, as set forth in Table I, were added and milling was continued until the additives were well dispersed within the rubber. The blend was then cut into strips so that it could easily be fed into the twin screw extruder. The material was extruded at 200° C. into a quenching water bath and subsequently chopped into small pellets which were then injection molded intoplaques (15.2×10.2×0.2 cm). The plaques were tested for physical properties. Table I sets forth the composition of the various blends whereas Table II sets forth the properties of the blends. All tests were according to ASTM standards.

TABLE I

| COMPONENT | 1* | 2 | 3 | 4* | 5 | 6 | 7 | 8* | 9 | 10 | 11 |
|---|---|---|---|---|---|---|---|---|---|---|---|
| FRS 1502 | 60 | 30 | 50 | 60 | 40 | 40 | 40 | 60 | 50 | 40 | 30 |
| Profax 6523 | 40 | 40 | 40 | — | — | — | — | — | — | — | — |
| Zinc Oxide | 3 | 3 | 3 | 3 | 3 | 3 | 3 | 4 | 4 | 4 | 4 |
| Stearic Acid | 1 | 1 | 1 | 1 | 1 | 1 | 1 | 1 | 1 | 1 | 1 |
| Santocure NS | 0.2 | 0.2 | 0.2 | 0.2 | 0.2 | 0.2 | 0.2 | — | — | — | — |
| FEF C-black | 10 | 10 | 10 | 10 | 10 | 10 | 10 | 10 | 10 | 10 | 10 |
| Irganox 1076 | 0.3 | 0.3 | 0.3 | 0.3 | 0.3 | 0.3 | 0.3 | 0.3 | 0.3 | 0.3 | 0.3 |
| Sohio Bitumen (190° F.) | — | 30 | 10 | — | — | — | — | — | 10 | 20 | 30 |
| Pioneer 787 (385° F.) | — | — | — | — | — | — | 20 | — | — | — | — |
| Pioneer 442 (310° F.) | — | — | — | — | 20 | — | — | — | — | — | — |
| Pioneer 566 (250° F.) | — | — | — | — | — | 20 | — | — | — | — | — |
| Amoco 1016 | — | — | — | 40 | 40 | 40 | 40 | 40 | 40 | 40 | 40 |
| TMTD | — | — | — | — | — | — | — | — | 0.4 | 0.4 | 0.4 | 0.4 |
| Sulfur | 0.2 | 0.2 | 0.2 | 0.2 | 0.2 | 0.2 | 0.2 | 0.3 | 0.3 | 0.3 | 0.3 |

*Control

TABLE II

| STOCK | TENSILE STRENGTH (MPa) | ULTIMATE STRAIN | TEAR (KN/m) RT | TEAR (KN/m) 100° C. | EXTRUDATE' SURFACE APPEARANCE |
|---|---|---|---|---|---|
| 1 | 7.42 | 2.70 | 52 | 28 | 4 |
| 2 | 9.47 | 5.59 | 60 | 30 | 2 |
| 3 | 8.74 | 4.96 | 60 | 28 | 3 |
| 4 | 7.17 | 2.50 | 51 | 22 | 3 |
| 5 | 7.32 | 2.93 | 60 | 29 | 2 |
| 6 | 7.28 | 3.03 | 54 | 28 | 2 |
| 7 | 7.39 | 3.67 | 59 | 30 | 2 |
| 8 | 7.27 | 2.84 | 55 | 22 | 4 |
| 9 | 9.52 | 4.33 | 53 | 23 | 4 |
| 10 | 9.40 | 4.02 | 51 | 26 | 4 |
| 11 | 8.09 | 3.13 | 45 | 29 | 3 |

'Scale 1 to 5, extrudate from melt index test
1 very smooth
5 very rough melt fracture The examples can be divided into three groups (1 to 3, 4 to 7, and 8 to 11) that illustrate the effect of bitumen addition on the physical properties of various styrene-butadiene rubbers and polypropylene compositions. Comparing examples 1 (control), 2 and 3, it is seen that the addition of bitumen results in a material with improved tensile strength and elongation, higher tear strength, and smoother extrudate surface.

Similar results are found when using different types of bitumen and another type of polypropylene (see examples 4 through 7). Whereas in the previous set of examples, there was no significant improvement in hot tear strength with bitumen addition, examples 5, 6 and 7 show a substantial improvement in hot tear compared to the control (example 4) when bitumen is substituted for a portion of the styrene-butadiene rubber.

The last series of examples (8 to 11) shows that adding bitumen improves all properties relative to the control except room temperature tear strength which decreases slightly.

Generally, the larger the bitumen level, the smoother the extrudate surface. This is particularly important for tubing or wire coating compositions.

While in accordance with the patent statutes, the best mode and preferred embodiments have been illustrated and described in detail, the scope of the invention is measured by the attached claims.

What is claimed is:

1. A theromplastic elastomer composition comprising, a blend of
    from about 30 to about 45 parts by weight of a crystalline 1-olefin polymer, said 1-olefin polymer selected from the class consisting of a homopolymer of polyethylene, polypropylene, and a copolymer made from monomers of ethylene and propylene, said homopolymer or said copolymer having a melting point of at least 90° C.;
    from about 65 to about 25 parts by weight of a random styrene-butadiene rubber;
    from about 10 to about 40 parts by weight of a bitumen,
    wherein said bitumen is an asphalt, a tar, or a tar derivative,
    said asphalt selected from the group consisting of a petroleum asphalt, a native asphalt, and combinations thereof,
    said petroleum asphalt selected from the group consisting of straight-reduced asphalts, thermal asphalts, and air-blown asphalts,
    said native asphalts selected from the group consisting of an asphalt with a mineral content below 5 percent, an asphalt with a mineral content above 5 percent, and combinations thereof,
    said tar selected from the group consisting of a coal tar reduced to float grade, a coal-tar pitch, and combinations thereof,
    said tar derivative being a residual from pyrogenous distillates, and
    said blend forming a thermoplastic elastomer, said thermoplastic elastomer capable of being repeatedly reprocessed.

2. A thermoplastic elastomer composition according to claim 1, wherein said 1-olefin homopolymer is polypropylene, wherein said 1-olefin copolymer is made from a major amount by weight of propylene monomers and a minor amount by weight of ethylene monomers, and
    wherein said bitumen is said petroleum asphalt.

3. A thermoplastic elastomer composition according to claim 2, wherein the molecular weight of said polypropylene or said propylene copolymer ranges from about 20,000 to about 1,000,000, wherein the molecular weight of said styrene-butadiene rubber ranges from about 50,000 to about 1,000,000, and wherein the softening point of said bitumen ranges from about 50° F. to about 400° F.

4. A thermoplastic elastomer composition according to claim 3, wherein the melting point of said 1-olefin polymer or copolymer is at least 130° C.

5. A thermoplastic elastomer composition according to claim 3 or 4, wherein said thermoplastic elastomer composition is in the form of tubing, a cable, a gasket, a toy, a household article, or a wire coating.

* * * * *